United States Patent
McKinnon et al.

(10) Patent No.: US 12,327,321 B2
(45) Date of Patent: Jun. 10, 2025

(54) AUTOMATIC DETECTION OF THE PRESENCE OF A MOVING PLATFORM

(71) Applicant: Microsoft Technology Licensing, LLC, Redmond, WA (US)

(72) Inventors: David John McKinnon, Redmond, WA (US); Joshua Aidan Elsdon, Bellevue, WA (US); Max S Kaznady, Arlington, MA (US); Evan Gregory Levine, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 18/090,712

(22) Filed: Dec. 29, 2022

(65) Prior Publication Data

US 2024/0221322 A1 Jul. 4, 2024

(51) Int. Cl.
*G06T 7/20* (2017.01)
*G06T 19/00* (2011.01)

(52) U.S. Cl.
CPC .............. *G06T 19/006* (2013.01); *G06T 7/20* (2013.01); *G06T 2207/20081* (2013.01)

(58) Field of Classification Search
CPC .................... G06T 19/006; G06T 7/20; G06T 2207/20081; G06V 20/20
See application file for complete search history.

(56) References Cited

U.S. PATENT DOCUMENTS

| | | | | |
|---|---|---|---|---|
| 2002/0097041 A1* | 7/2002 | Vescovi | ............. | G06F 3/011 324/207.17 |
| 2018/0372499 A1* | 12/2018 | Ali | ............. | G06T 7/248 |
| 2020/0271450 A1 | 8/2020 | Gorur Sheshagiri et al. | | |
| 2022/0374130 A1 | 11/2022 | Pu | | |
| 2022/0375105 A1 | 11/2022 | Elsdon et al. | | |

FOREIGN PATENT DOCUMENTS

WO 2020190380 A1 9/2020

OTHER PUBLICATIONS

International Search Report and Written Opinion received for PCT Application No. PCT/US2023/036218, (Ms# 412530-PCT01) Feb. 14, 2024, 14 pages.
Khalifa, et al., "Human Activity Recognition for Indoor Positioning using Smartphone Accelerometer," Retrieved from the URL: https://cgi.cse.unsw.edu.au/~reports/papers/201303.pdf, Sydney Australia, Jan. 1, 2013, 20 Pages.
Zhou, et al., "Smartphone-Based Activity Recognition for Indoor Localization Using a Convolutional Neural Network," Sensors, vol. 19, No. 3, Feb. 1, 2019, 15 Pages.

* cited by examiner

*Primary Examiner* — Jitesh Patel
(74) *Attorney, Agent, or Firm* — Workman Nydegger

(57) ABSTRACT

Techniques for intelligently identifying what type of moving platform an MR system is operating on are disclosed. A display artifact that is associated with content displayed by the MR system is detected. A determination is made that a current configuration of a motion model used to display the content is causing the display artifact. Time-limited series of convoluted motion data is analyzed. The time-limited series of convoluted motion data is fed as input to a predictive ML algorithm. The predictive ML algorithm determines a particular category for the moving platform based on the time-limited series of convoluted motion data. Based on the determined category, either a reconfigured version of the motion model is used or a new motion model is used to display a hologram.

20 Claims, 18 Drawing Sheets

AUTOMATIC DETECTION OF THE PRESENCE OF A MOVING PLATFORM

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system can be used to display various different types of information to a user. Some of that information is displayed in the form of augmented reality or virtual reality content, which can also be referred to as a "hologram." That is, as used herein, the term "hologram" generally refers to image content that is displayed by the MR system. In some instances, the hologram can have the appearance of being a three-dimensional (3D) object while in other instances the hologram can have the appearance of being a two-dimensional (2D) object.

Often, holograms are displayed in a manner as if they are a part of the actual physical world. For instance, a hologram of a flower vase might be displayed on a real-world table. In this scenario, the hologram can be considered as being "locked" or "anchored" to the real world. Such a hologram can be referred to as a "world-locked" hologram or a "spatially-locked" hologram that is spatially anchored to the real world. Regardless of the user's movements, a world-locked hologram will be displayed as if it was anchored or associated with the real-world. A motion model, such as a Kalman filter, is typically used to facilitate the display of a world-locked hologram. A motion model is a type of transformation matrix that enables the projection of content to a known location or scene, despite various movements occurring.

In contrast, a field of view (FOV) locked hologram is a type of hologram that is persistently displayed at a particular location in the user's FOV regardless of any movement of the user's FOV. For instance, a FOV locked hologram may be persistently displayed in the upper right corner of the user's FOV.

To properly display a world-locked hologram, the MR system is tasked with gaining a spatial understanding of its environment. This spatial understanding is often achieved via use of the MR system's cameras and inertial measurement units (IMUs), which includes various accelerometers, gyroscopes, and magnetometers. The MR system feeds the data generated from these subsystems to a motion model, which is then relied on to anchor the hologram to a position in the real world.

Such practices can readily be used when a user's environment is stationary; however, problems arise when the user is in a moving environment or a moving platform. For instance, consider a scenario where the user is using his/her MR system in a moving vehicle or an elevator or a plane. Even though a user may be stationary relative to a vehicle, if the vehicle is moving, then the resulting IMU data will include acceleration and various other forces on the user. If that IMU data were fed into the motion model, then the motion model may incorrectly generate the anchor points for the hologram, resulting in the hologram being displayed improperly relative to the environment.

Traditional techniques at addressing this problem were rudimentary. In particular, the conventional techniques included querying the user and asking the user if he/she was on or was about to enter a moving platform. The parameters of the motion model would then be modified based on the user's response. Furthermore, the parameters were modified in a generic manner, regardless of the type of platform the user was on. Thus, a slow moving cruise liner and an abruptly moving bus were considered to essentially be the same, and the parameters of the motion model were modified in the same way despite differences in the types of platforms. What is needed, therefore, is an improved technique for identifying what type of moving platform an MR system is on so that the motion model can then be updated accordingly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods that intelligently identify what type of moving platform an MR system is operating on. One benefit of making this determination is that the parameters of a motion model (e.g., a Kalman filter) can then be fine-tuned.

Some embodiments use a trained predictive machine learning (ML) algorithm to use convoluted motion data to inferentially determine a category for a moving platform on which a mixed-reality (MR) system is operating. The convoluted motion data comprises at least a first signal (e.g., the movement for the MR system) and a second signal (e.g., the movement for the moving platform), and the trained predictive ML algorithm determines the category without decomposing the convoluted signal.

The embodiments detect a display artifact that is associated with content displayed by the MR system. The embodiments determine that a current configuration of a motion model used to display the content is causing the display artifact. The embodiments analyze a time-limited series of convoluted motion data. The time-limited series of convoluted motion data includes first motion data representing a motion of the MR system and second motion data representing a motion of the moving platform. The first motion data is convoluted with the second motion data to form the time-limited series of convoluted motion data.

The embodiments access the trained predictive ML algorithm, which is trained to categorize moving platforms using convoluted motion data without decomposing the convoluted motion data into its constituent motion data components. The time-limited series of convoluted motion data is fed as input to the predictive ML algorithm. The embodiments then cause the predictive ML algorithm to determine a particular category for the moving platform based on the time-limited series of convoluted motion data. Based on the determined category, the embodiments trigger, in real time, either (i) use of a reconfigured version of the motion model or (ii) use of a new motion model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
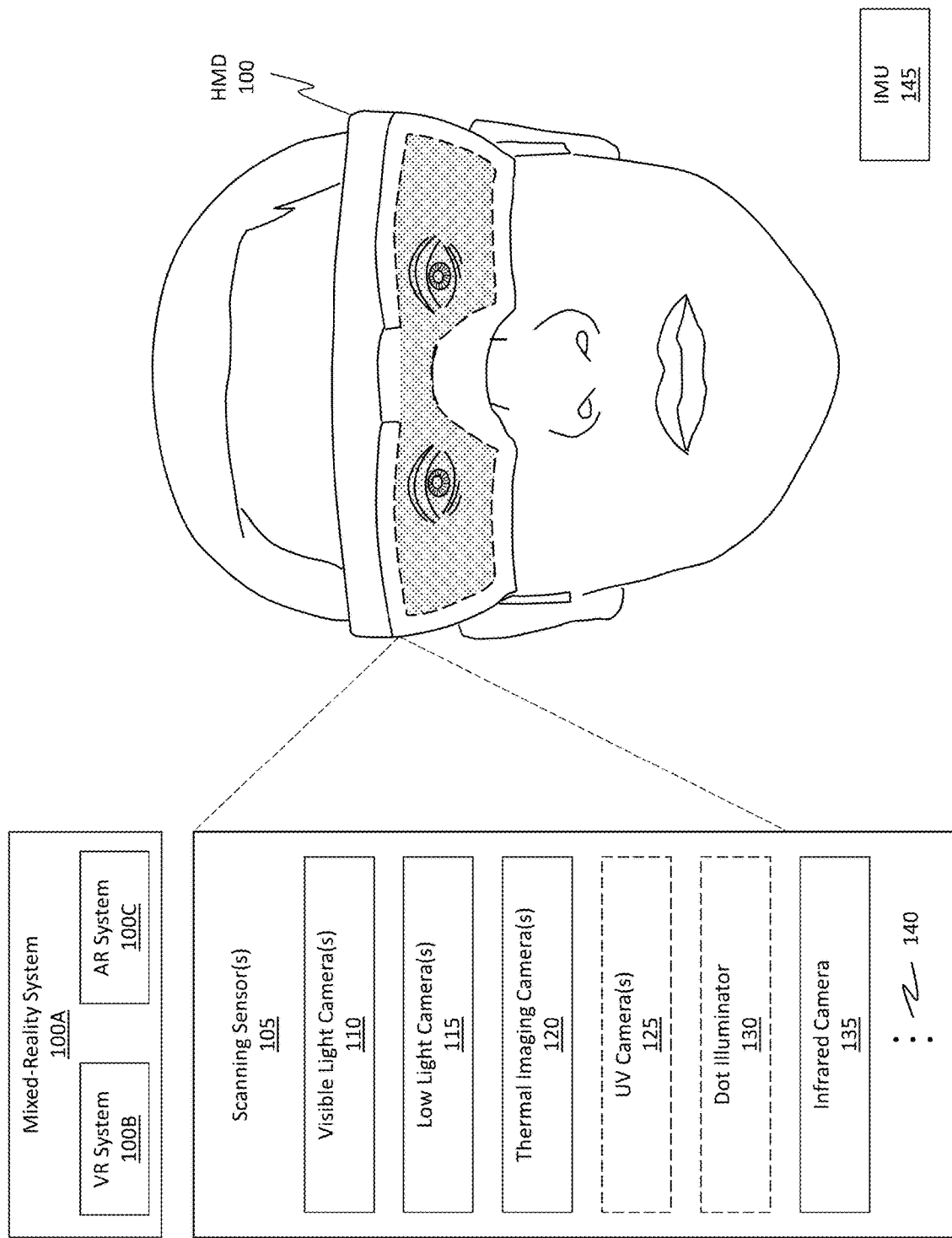
FIG. 1 illustrates an example head mounted device (HMD) configured to perform the disclosed operations.

Embodiments disclosed herein relate to systems, devices, and methods that intelligently identify what type of moving platform an MR system is operating on. One benefit of making this determination is that the parameters of a motion model (e.g., a Kalman filter) can then be fine-tuned. This disclosure is primarily focused on the intelligent identification of what type of moving platform the MR system is on.

Selecting fine-tuned parameters is a beneficial result that can be achieved based on the intelligent categorization of the environment or platform. As used herein, the terms "environment" and "platform" can be used interchangeably and generally refer to a location or scene in which an MR system is being used.

Some embodiments use a trained predictive machine learning (ML) algorithm to use convoluted motion data to inferentially determine a category for a moving platform on which a mixed-reality (MR) system is operating. The convoluted motion data comprises at least a first signal and a second signal, and the trained predictive ML algorithm determines the category without decomposing the convoluted signal.

The embodiments detect a display artifact that is associated with content displayed by the MR system. The embodiments determine that a current configuration of a motion model used to display the content is causing the display artifact. The embodiments analyze a time-limited series of convoluted motion data. The time-limited series of convoluted motion data includes first motion data representing a motion of the MR system and second motion data representing a motion of the moving platform. The first motion data is convoluted with the second motion data to form the time-limited series of convoluted motion data. The embodiments access the trained predictive ML algorithm, which is trained to categorize moving platforms using convoluted motion data without decomposing the convoluted motion data into its constituent motion data components. The time-limited series of convoluted motion data is fed as input to the predictive ML algorithm. The embodiments then cause the predictive ML algorithm to determine a particular category for the moving platform based on the time-limited series of convoluted motion data. Based on the determined category, the embodiments trigger, in real time, either (i) use of a reconfigured version of the motion model or (ii) use of a new motion model.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

To render holograms in an MR system, the position of the device in three-dimensional (3D) space is required. Rendering images from the perspective of this 3D location gives the user the impression that the holograms are located physically in their space. The disclosed embodiments beneficially enable a device to classify a type of motion that is detected for a platform/environment into one of several categories and thereafter set the new motion model parameters from this classification to accurately model the environment's motion going forward.

Using the same motion model parameters for all types of motion results in suboptimal tracking or even loss of tracking. The embodiments thus avoid such a scenario.

At a high level, the embodiments use a type of motion model (e.g., a Kalman filter) to estimate the environment's motion using various device inputs, such as motion sensors on the HMD. For instance, the HMD's IMU and head tracking system can provide an estimate of the environment's movement based on a disagreement that might exist between the inertial sensors and the vision system. As the vision system is measuring movement relative to the environment and as the inertial system is measuring movement relative to the inertial frame, the difference is the movement of the platform in the inertial frame. This information can be used to facilitate the categorization process.

The disclosed artificial intelligence (AI) or machine learning (ML) system runs on a truncated history of the platform's motion state (e.g., angular position, angular velocity, linear acceleration) and provides a classification of the platform's motion. For example, the platform's motion might not initially exist, so the classifier (i.e. the ML system or algorithm) will declare the device as not being on a moving platform. Alternatively, the device might be in a shaking bus, and the classifier can declare the device as being on a platform that is moving with a high frequency of motion. The number of classes and the length of history can vary.

The parameters in the Kalman filter/motion model for propagating states, such as decay coefficients and process noise, will be selected based on the class or category of the platform's motion, where that category was predicted by the ML algorithm. Optionally, a default assumption of no platform motion can initially be used.

The disclosed AI system can be based on a sequence-to-class temporal Deep Learning model such as a Temporal Convolutional Network (TCN) or Long Short-Term Memory model. Of course, other AI models can be used as well. Often, the history is truncated to no more than five seconds in length to account for the time taken for a vehicle or environment to change motion (e.g., a car accelerating or a plane taking off) and to reduce computational burden (e.g., power consumption) and to reduce processing latency.

In this manner, the disclosed embodiments bring about many different benefits, advantages, and practical applications to the technical field of mixed reality systems. Whereas with the conventional technology, the user was required to provide input as to whether an environment was moving, now the embodiments are able to independently determine whether an environment is moving based on certain collected sensor data. Furthermore, the embodiments are able to specifically identify what type or "category" of moving environment the MR system is operating in.

As an example, the embodiments are able to distinguish a moving bus-like environment as compared to a moving plane-like environment. As another example, the embodiments are able to distinguish a slow and smooth moving environment (e.g., perhaps a cruise liner-like environment) from a fast and abrupt moving environment (e.g., perhaps a plane-like environment). With a more granular identification of the type of environment in which the MR system is operating, additional benefits can be achieved, such as the intelligent generation, selection, or fine-tuning of the parameters of the motion model. That is, the parameters for a slow and smooth moving environment can now be different than the parameters for a fast and abrupt environment. This disclosure will primarily focus on the intelligent identification of the moving platform.

In any event, by intelligently identifying the type of moving platform, better or more representative parameters (with regard to the identified environment) can be provided to the motion model. As a direct consequence, the embodiments will directly improve the visual display of a hologram.

For instance, consider the following scenario. Suppose a user has entered an elevator, and a world-locked hologram is displayed inside the elevator with the user. When the elevator begins to move upward, if no updates to the motion model were performed, then the hologram will appear as if it is moving downward and might eventually be lost. Now, consider a scenario where the traditional or conventional techniques were used in which a user provided input to inform the system that the MR system was in a generalized moving platform. In this scenario, when the elevator begins to move, the hologram would likely appear as if it were momentarily jumping around to different positions. This "jumping" effect occurred because the motion model was not fine-tuned with regard to the particular movements of an elevator. Instead, generic parameters were used.

Now, however, the embodiments are able to intelligently identify the specific type of moving environment the MR system is located. Having this granular knowledge, various systems can then generate or select a set of parameters that are specifically tuned to the motion of an elevator. When the elevator moves, the hologram will remain in the desired, world-locked position.

By performing the disclosed principles, the embodiments will improve the visual display of the hologram because holograms can now remain locked in the desired, world-locked position despite movements of the platform. That is, the holograms will not be shown as jumping about. As a result, not only is the visual display of information improved, but also the user's experience with the MR system will be improved.

Although a majority of the examples provided herein are directed to MR systems and HMDs, a skilled person will recognize how the disclosed principles can be practiced in other environments or contexts. For instance, the principles can be employed for use with robotic agents that are tasked with making maps. The principles can also be employed with drones that operate inside of moving platforms as well. Furthermore, the principles can be employed using mobile phones, tablets, or any other handheld device that enables MR experiences. Thus, it should be appreciated that throughout this disclosure, the various references to MR system can be interchanged with drones, robots, or even mobile devices. Accordingly, these and numerous other benefits will now be discussed in more detail throughout the remaining portions of this disclosure.

Example MR Systems And HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. For instance, the disclosed operations can optionally be performed by a cloud service that is communicating with an HMD.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment. Scanning sensor(s) 105 may comprise any number or any type of scanning device, without limit.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras. HMD 100 is further shown as including an inertial measurement unit (IMU) 145. Further details on this feature will be provided shortly.

Figure 2:
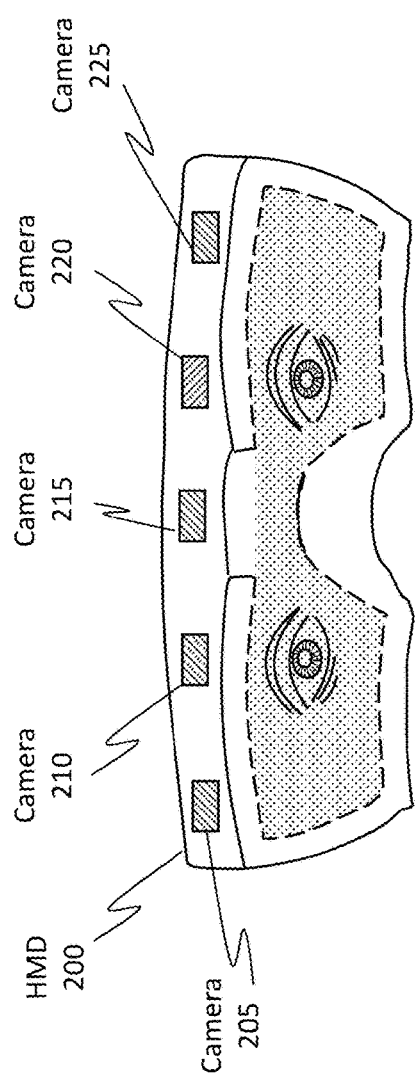
FIG. 2 illustrates another configuration of an HMD.
Figure 2:
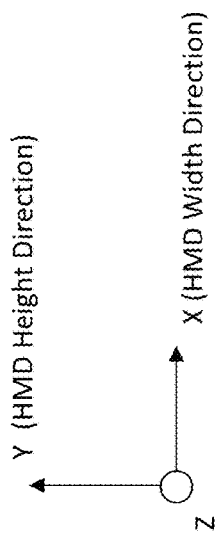

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

Figure 3:
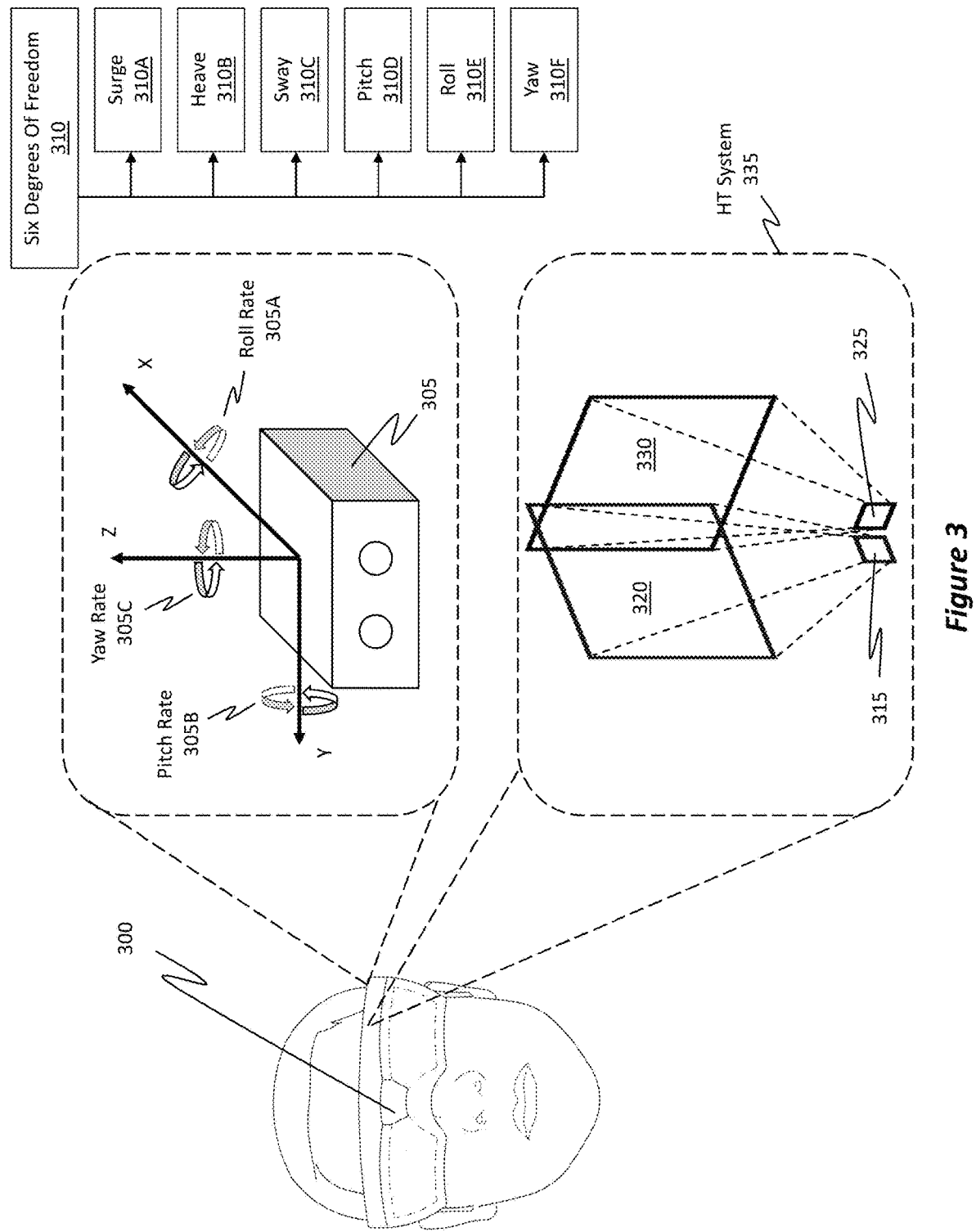
FIG. 3 illustrates how an HMD can include an inertial measurement unit (IMU).

FIG. 3 illustrates an example HMD 300 that is representative of the HMDs and MR systems discussed thus far. The descriptions "MR device" and "MR system" can be used interchangeably with one another. In some cases, HMD 300 is itself considered as an MR device. Therefore, references to HMDs, MR devices, or MR systems generally relate to one another and may be used interchangeably.

In accordance with the disclosed principles, HMD 300 is able to stabilize the visual placement of any number of holograms (e.g., 1, 2, 3, 4, 5, 10, 20, 30, 40, 50, or more than 50 holograms) rendered by the display of HMD 300 using IMU data and a motion model. This stabilization may occur even when certain position data, which is used for the visual placement, has conflicts or conflicting information as a result of it being collected while the HMD 300 was operating in a moving environment.

HMD 300 is shown as including an IMU 305, which is a representative of the IMU 145 from FIG. 1. IMU 305 is a type of device that measures force, angular adjustments/rates, orientation, acceleration, velocity, gravitational forces, and sometimes even magnetic fields. To do so, IMU 305 may include any number of data acquisition devices, which include any number of accelerometers, gyroscopes, and even magnetometers.

IMU 305 can be used to measure a roll rate 305A, a pitch rate 305B, and a yaw rate 305C. The IMU 305 can be used to measure the sum of gravitational acceleration and body acceleration in an inertial frame. IMU 305 can also measure angular rate as well as potentially an absolute orientation. It will be appreciated, however, that a motion sensor, which can include IMU 305, can measure changes in any of the six degrees of freedom 310. Six degrees of freedom 310 refers to the ability of a body to move in three-dimensional space. As an example, suppose HMD 300 is operating in the cockpit of an airplane rolling along a runway. Here, the cockpit may be considered as a "first" environment and the runway may be considered as a "second" environment. The first environment is moving relative to the second environment. Regardless of whichever environment HMD 300 is operating within, the movements of one environment relative to another environment (as recorded or monitored by at least some of HMD 300's data acquisition devices) can be detected or measured in any one or more of the six degrees of freedom 310.

Six degrees of freedom 310 include surge 310A (e.g., forward/backward movement), heave 310B (e.g., up/down movement), sway 310C (e.g., left/right movement), pitch 310D (e.g., movement along a transverse axis), roll 310E (e.g., movement along a longitudinal axis), and yaw 310F (e.g., movement along a normal axis). Relatedly, 3DOF characteristics include only the pitch 310D, roll 310E, and yaw 310F. The embodiments are able to use 6DOF information or 3DOF information.

Accordingly, IMU 305 can be used to measure changes in force and changes in movement, including any acceleration changes of HMD 300. This collected data can be used to help determine a position, a pose, and/or a perspective of HMD 300 relative to its environment. To improve the position and pose determinations, the data generated by IMU 305 can augment or supplement data collected by a head tracking (HT) system. The pose information is used to display holograms in the scene.

FIG. 3 also shows a first HT camera 315, with its corresponding field of view (FOV) 320 (i.e. the observable area of HT camera 315, or rather the observable angle through which HT camera 315 is able to capture electromagnetic radiation), and a second HT camera 325, with its corresponding FOV 330. While only two HT cameras are illustrated, it will be appreciated that any number of HT cameras may be used on HMD 300 (e.g., 1 camera, 2, 3, 4, 5, or more than 5 cameras). Furthermore, these cameras may be included as a part of a HT system 335 implemented on HMD 300.

HT cameras 315 and 325 can be any type of HT camera. In some cases, HT cameras 315 and 325 may be stereoscopic HT cameras in which a part of FOVs 320 and 330 overlap with one another to provide stereoscopic HT operations. In other embodiments, HT cameras 315 and 325 are other types of HT cameras. In some cases, HT cameras 315 and 325 are able to capture electromagnetic radiation in the visible light spectrum and generate visible light images. In other cases, HT cameras 315 and 325 are able to capture electromagnetic radiation in the infrared (IR) spectrum and generate IR light images. In some cases, HT cameras 315 and 325 include a combination of visible light sensors and IR light sensors. In some cases, HT cameras 315 and 325 include or are associated with depth detection functionalities for detecting depth in the environment.

Accordingly, HMD 300 is able to use display positioning information generated by IMU 305 and display positioning information generated by HT system 335 to determine HMD 300's position and pose. This position and pose information will then enable HMD 300 to accurately render a hologram within an MR scene provided by HMD 300. For instance, if a hologram is to be fixedly displayed on a wall of a room, then the position and pose of HMD 300 are used during the hologram's placement operation to ensure that the hologram is rendered/placed at the proper wall location.

More specifically, to complete the hologram placement operation, the information from the HT cameras and the information from the IMU(s) can be combined using a motion model, such as a Kalman filter, to provide robust head tracking position and pose estimation and to perform hologram placement using the position and pose information. As used herein, a "Kalman" filter is a type of combining algorithm in which multiple sensor inputs, which were collected over a defined time period and which were collected using the IMU(s) and HT cameras, are combined together to provide more accurate display positioning information than that which could be achieved by either sensor alone. This combination may occur even in the face of statistical noise and/or other inaccuracies. This combined data is what is used during hologram placement.

Moving Platforms

Figure 4:
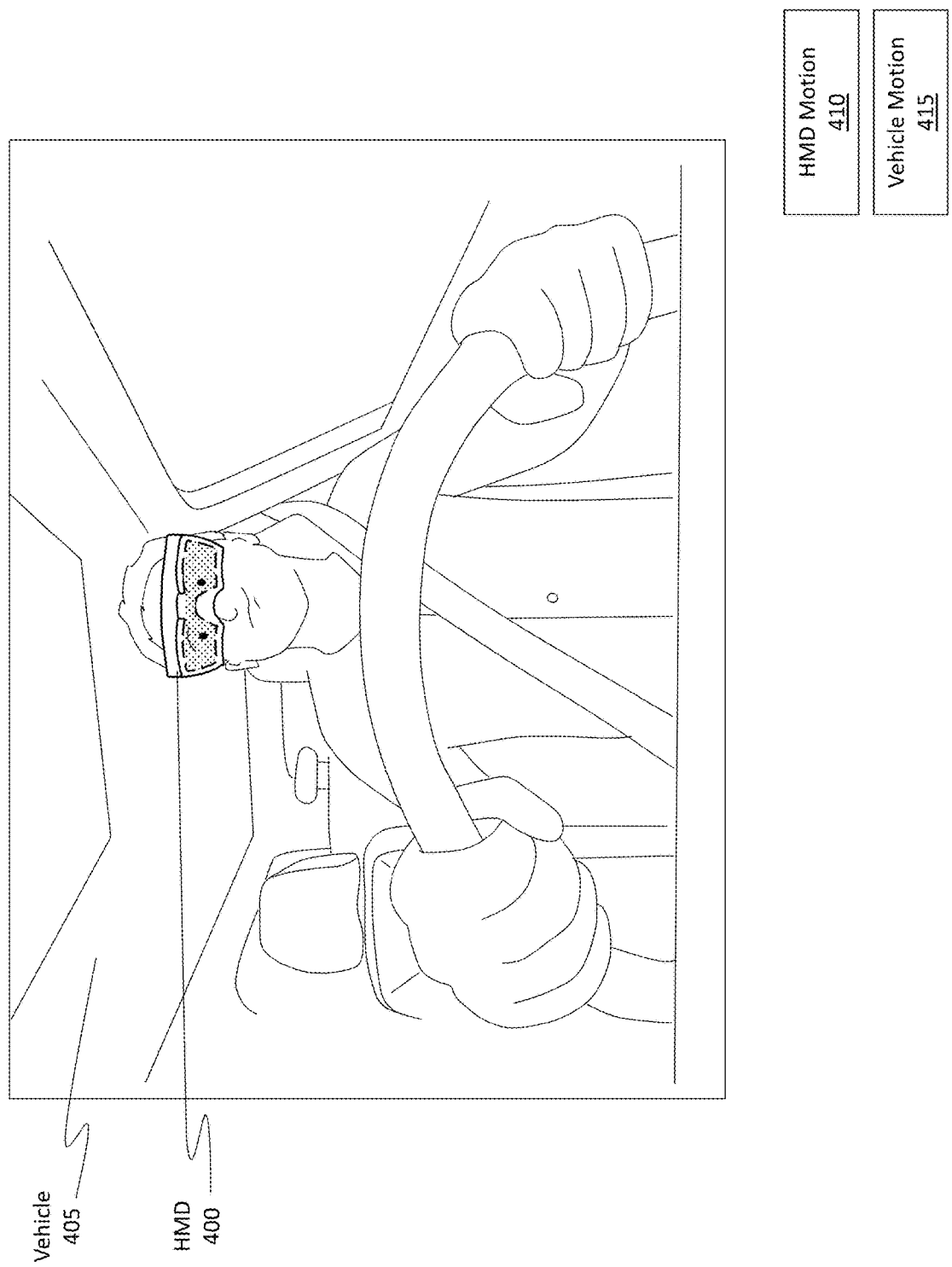
FIG. 4 illustrates one example of a moving platform.
Figure 5:
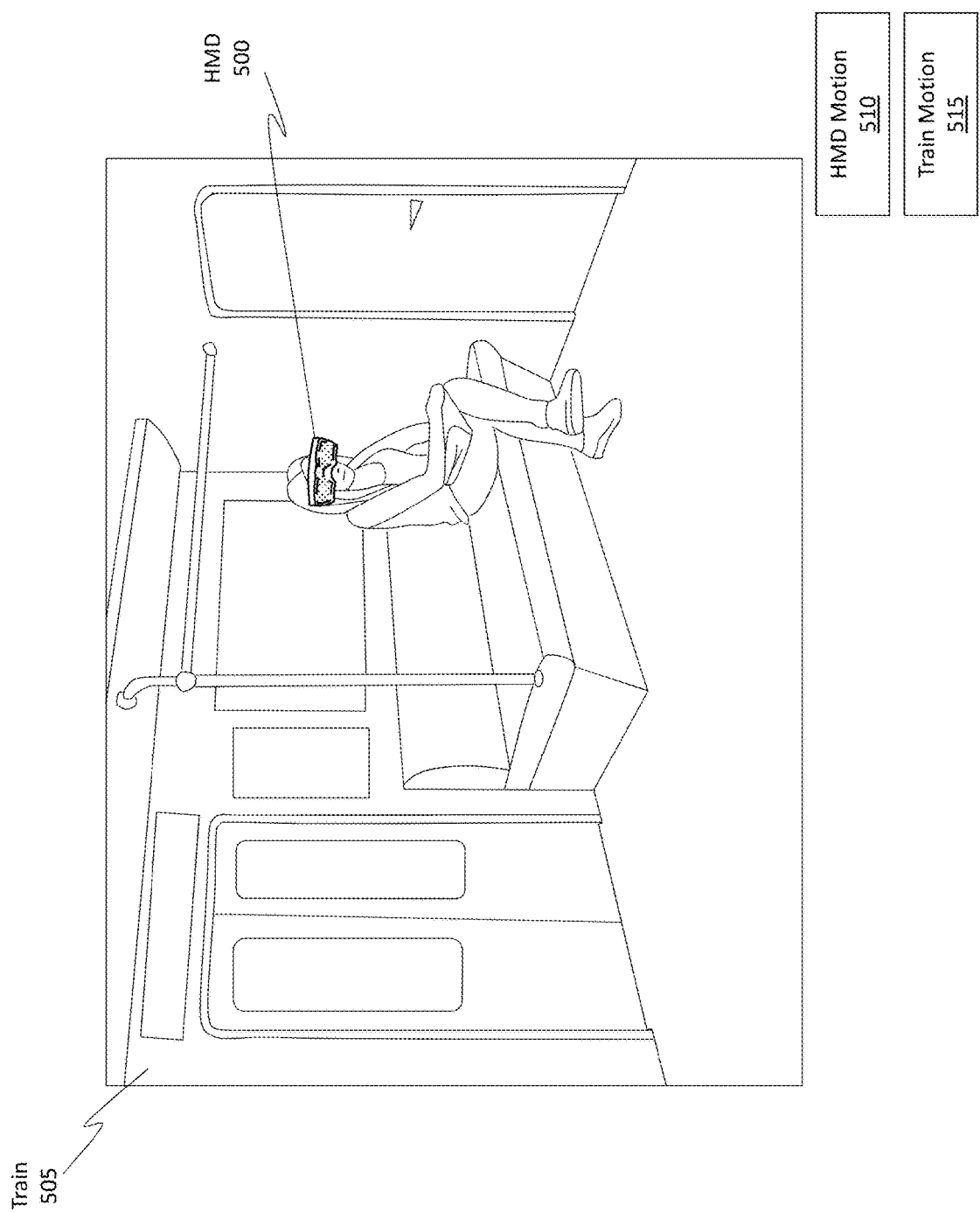
FIG. 5 illustrates another example of a moving platform.
Figure 6:
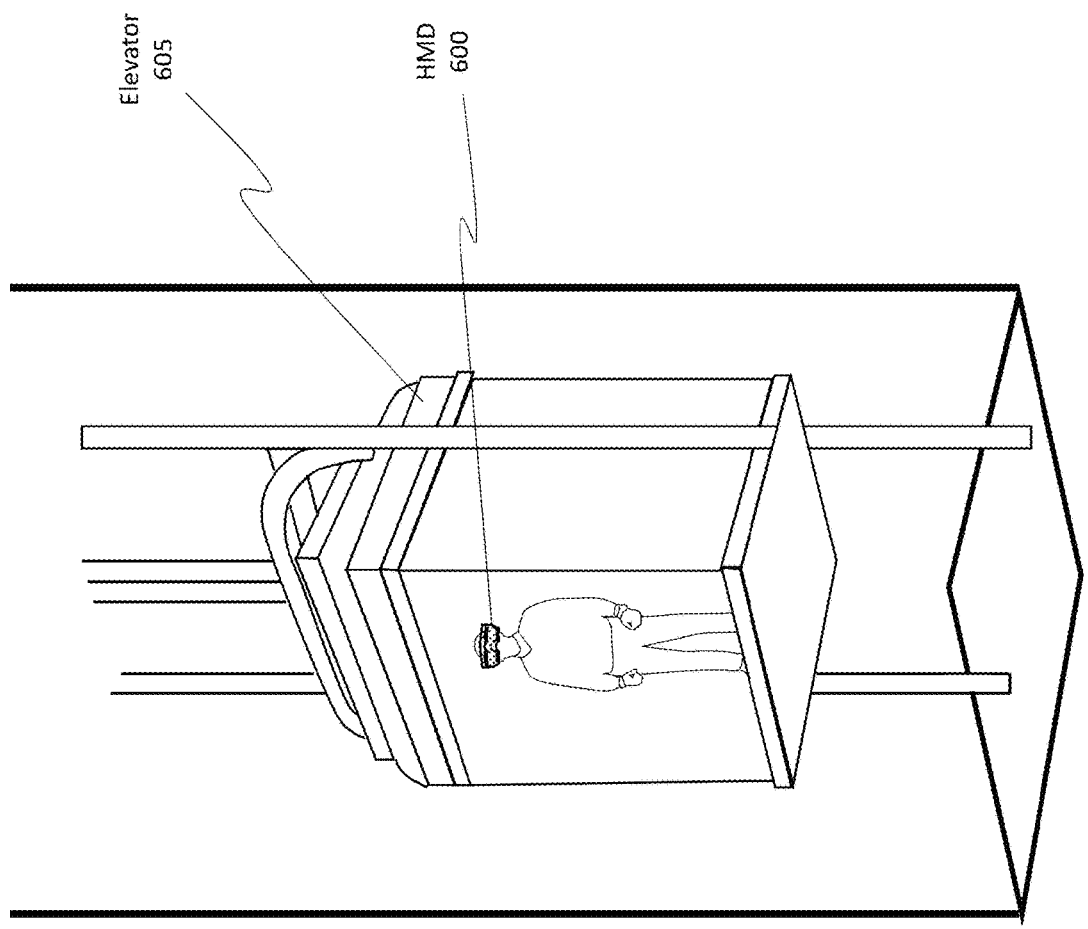
FIG. 6 illustrates another example of a moving platform.

Attention will now be directed to FIGS. 4, 5, and 6, which show various examples of how an HMD/MR system can be located on a moving platform. The HMD can move, and the moving platform can move.

FIG. 4 shows an example HMD 400 located within the confines of a moving platform, in this case a vehicle 405. It should be noted how the HMD can move, as shown by HMD motion 410, and how the vehicle 405 can move, as shown by vehicle motion 415. The HMD's IMU does not distinguish between the HMD's movements and the vehicle's movements, so the IMU generates data that reflects a convoluted combination of the HMD's movements and the vehicle's movements. As a simplistic example, the HMD movement signal might have a higher frequency than the vehicle movement signal, so the HMD movement signal can be thought of as riding on the carrier wave of the vehicle movement signal.

FIG. 5 shows another example scenario. In FIG. 5, an HMD 500 is located on a train 505. The HMD 500 can move, as shown by HMD motion 510, and the train 505 can move, as shown by train motion 515. The IMU in this scenario also generates a set of convoluted motion data.

FIG. 6 shows yet another example scenario. In FIG. 6, an HMD 600 is located in an elevator 605. The elevator 605 is shown as having a movement direction 610. One will appreciate how both the HMD 600 and the elevator 605 can both move, resulting in the generation of a set of convoluted motion data.

Display Artifacts

Figure 7A:
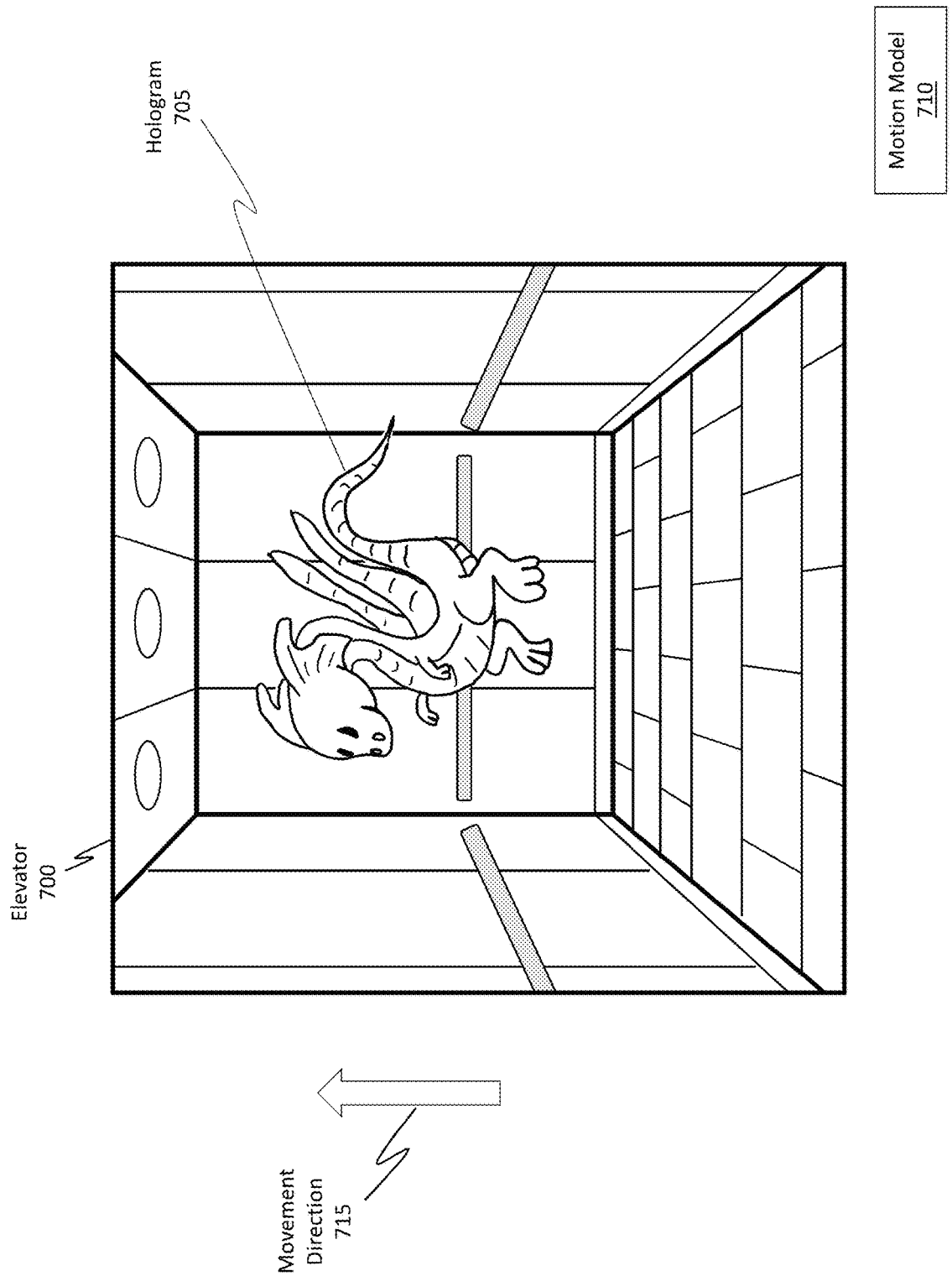
FIGS. 7A, 7B, and 7C illustrate the display of a hologram in a moving platform.
Figure 7B:
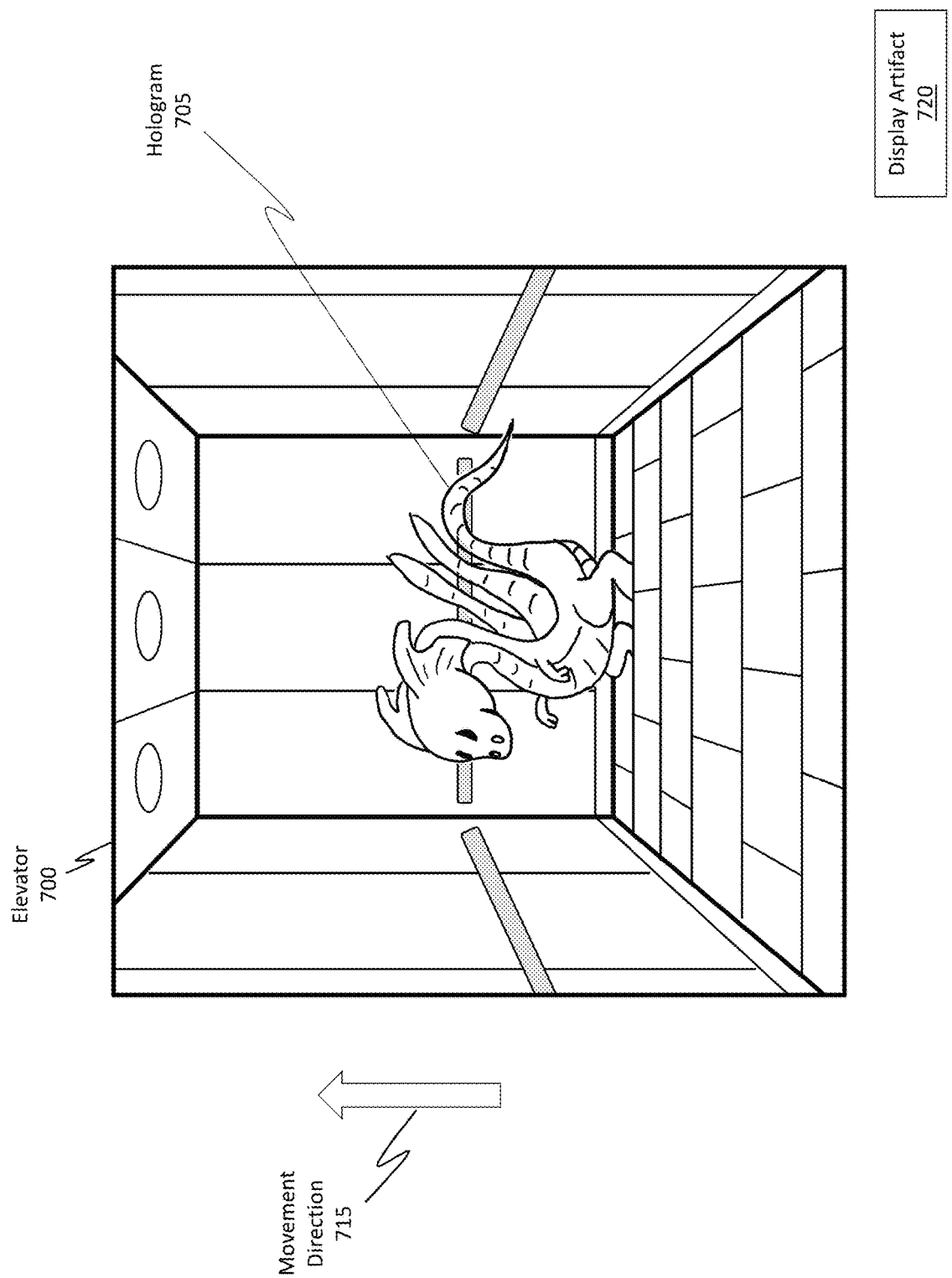
Figure 7C:
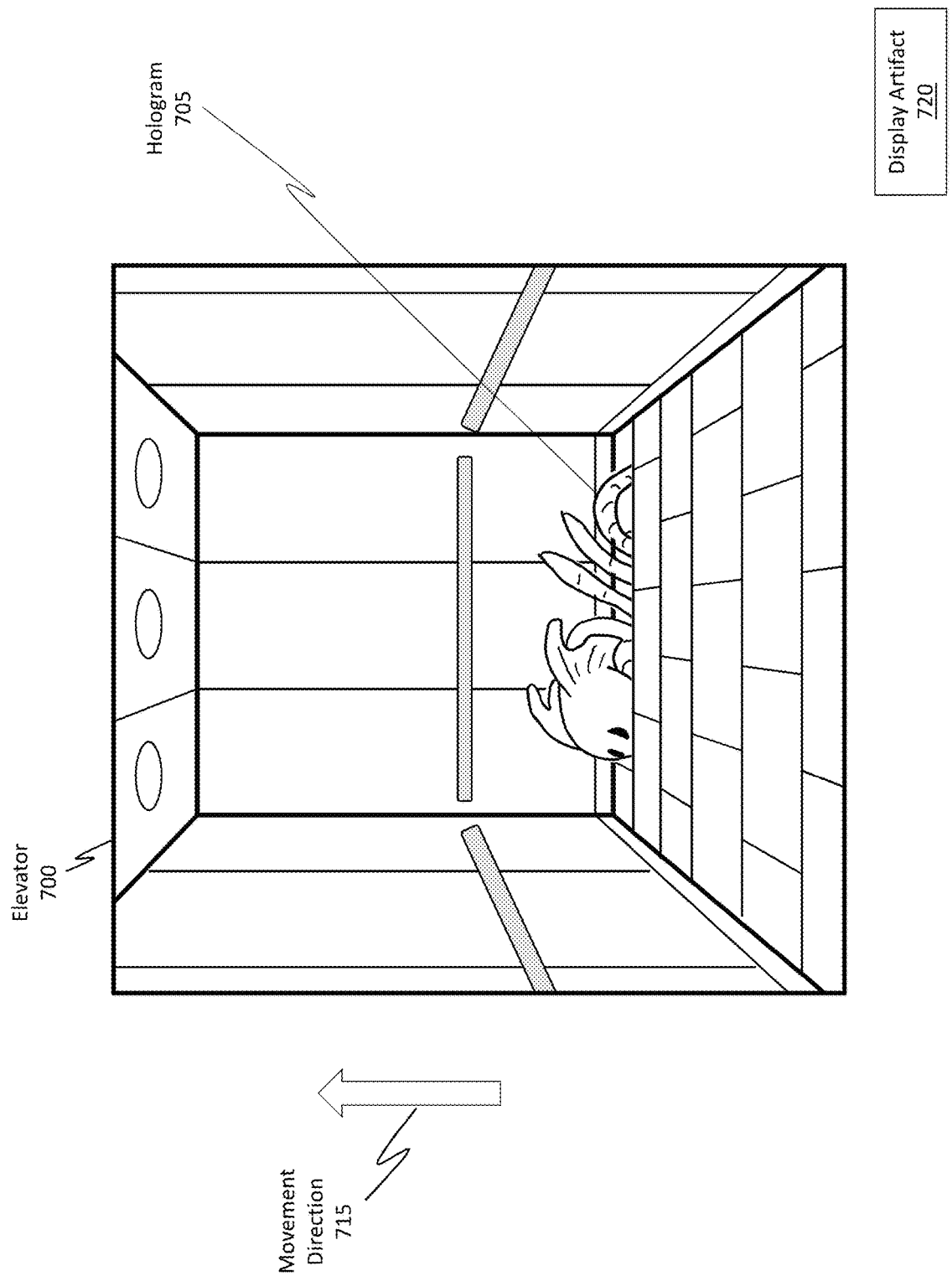

The previous scenarios and examples were provided to illustrate how an HMD can operate in many different environments. Notably, however, when that environment, or platform, moves, the movement of the platform can result in the generation of different display artifacts when it comes to displaying a world-locked hologram. Recall, the placement of a hologram is often dependent on IMU data. If a platform is moving, then the IMU data will reflect any movements of the HMD as well as the movement of the platform itself. Further recall, a motion model is typically used to facilitate the display of the hologram. It is often the case that the parameters of the motion model are set to reflect a stationary platform. Thus, when the platform begins to move, the configuration of the motion model causes various display artifacts to occur because the movement of the environment is not being compensated for by the motion model. FIGS. 7A, 7B, and 7C demonstrate the occurrence of one example display artifact.

FIG. 7A shows a world-locked hologram 705 that is being displayed in an elevator 700. A motion model 710 is currently being used to facilitate the display of the hologram 705. In this scenario, the motion model 710 is configured as a stationary motion model that presumes the world or platform is stationary. FIG. 7A also shows how the elevator 700 is beginning to move in a movement direction 715.

Because the motion model 710 presumes that the platform is stationary, when the elevator 700 begins to move, a display artifact occurs, as shown in FIGS. 7B and 7C. In particular, in FIG. 7B, the hologram 705 is shown as having shifted position in response to the movement direction 715 even though the hologram 705 is supposed to be locked or anchored at a particular position in the elevator 700. This shift in position is one example of the display artifact 720. That is, a visual displacement of the hologram from its intended location can be considered as being a display artifact. Another example of a display artifact is a scenario where the hologram is shown as unintentionally jumping around from one position to another.

The display artifact 720 is even more pronounced in FIG. 7C because of the continued movement of the elevator 700. The display artifact 720 occurs because of a configuration issue with the motion model in that the motion model is not configured to accommodate moving platforms. What is needed, therefore, is an improved technique for configuring a motion model to enable that motion model to adequately adjust when a platform on which an HMD or an MR system is operating on is moving.

Example Architectures

Figure 8:
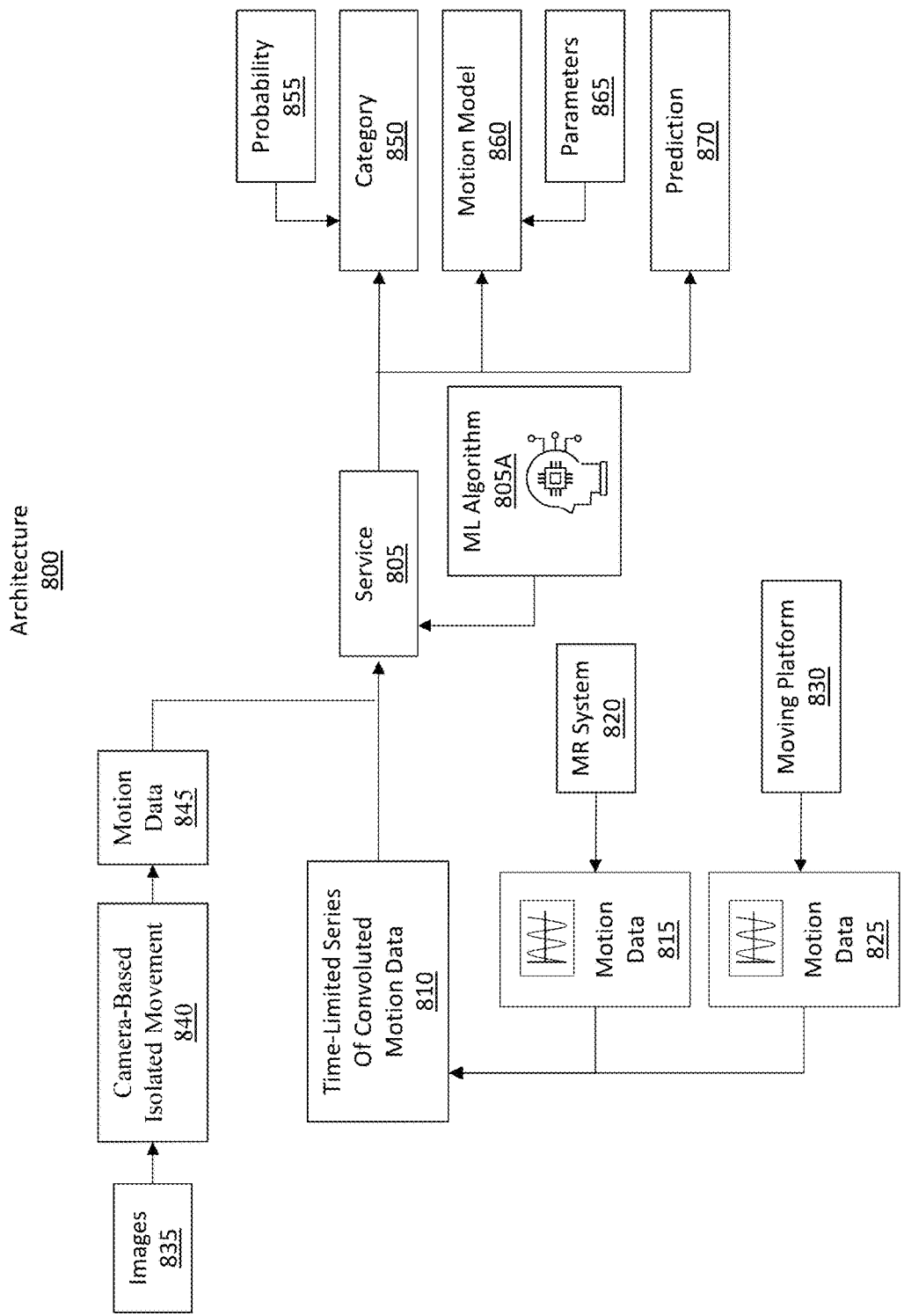
FIG. 8 illustrates an example architecture for determining a category for a moving platform.

FIG. 8 shows an example architecture 800 that can provide the various benefits, advantages, and practical applications disclosed herein. In particular, the disclosed architecture 800 is configured to use a trained predictive machine learning (ML) algorithm. This ML algorithm uses convoluted motion data to inferentially determine a category for a moving platform on which an MR system is operating. The convoluted motion data includes at least a first signal (e.g., the motion data for the MR system) and a second signal (e.g., the motion data for the moving platform). The trained predictive ML algorithm determines the category without necessarily decomposing the convoluted signal into its constituent parts.

Architecture 800 is shown as including a service 805. Service 805 is shown as including a machine learning (ML) algorithm 805A. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The embodiments are able to generate, access, or otherwise obtain a time-limited series of convoluted motion data 810. This time-limited series of convoluted motion data 810 includes IMU data that is generated by the MR system. For instance, the IMU 305 from FIG. 3 can collect the convoluted motion data.

The convoluted motion data includes at least two signals or at least two different types of motion data. For instance, the time-limited series of convoluted motion data 810 includes first motion data 815, which reflects any motion of the MR system 820, and includes second motion data 825, which reflects any motion of the moving platform 830.

Figure 9A:
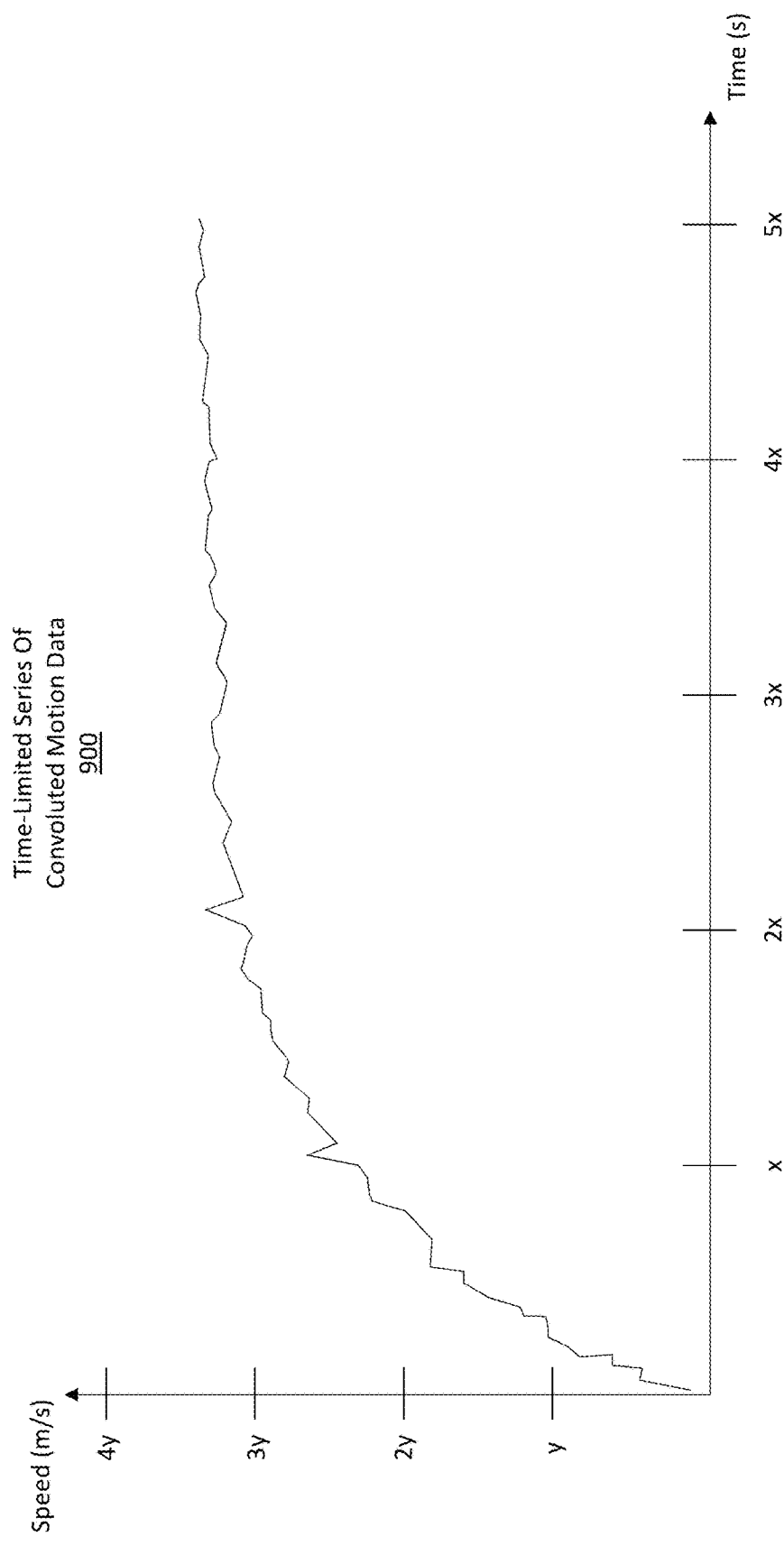
FIGS. 9A, 9B, and 9C illustrate various different signal types.
Figure 9B:
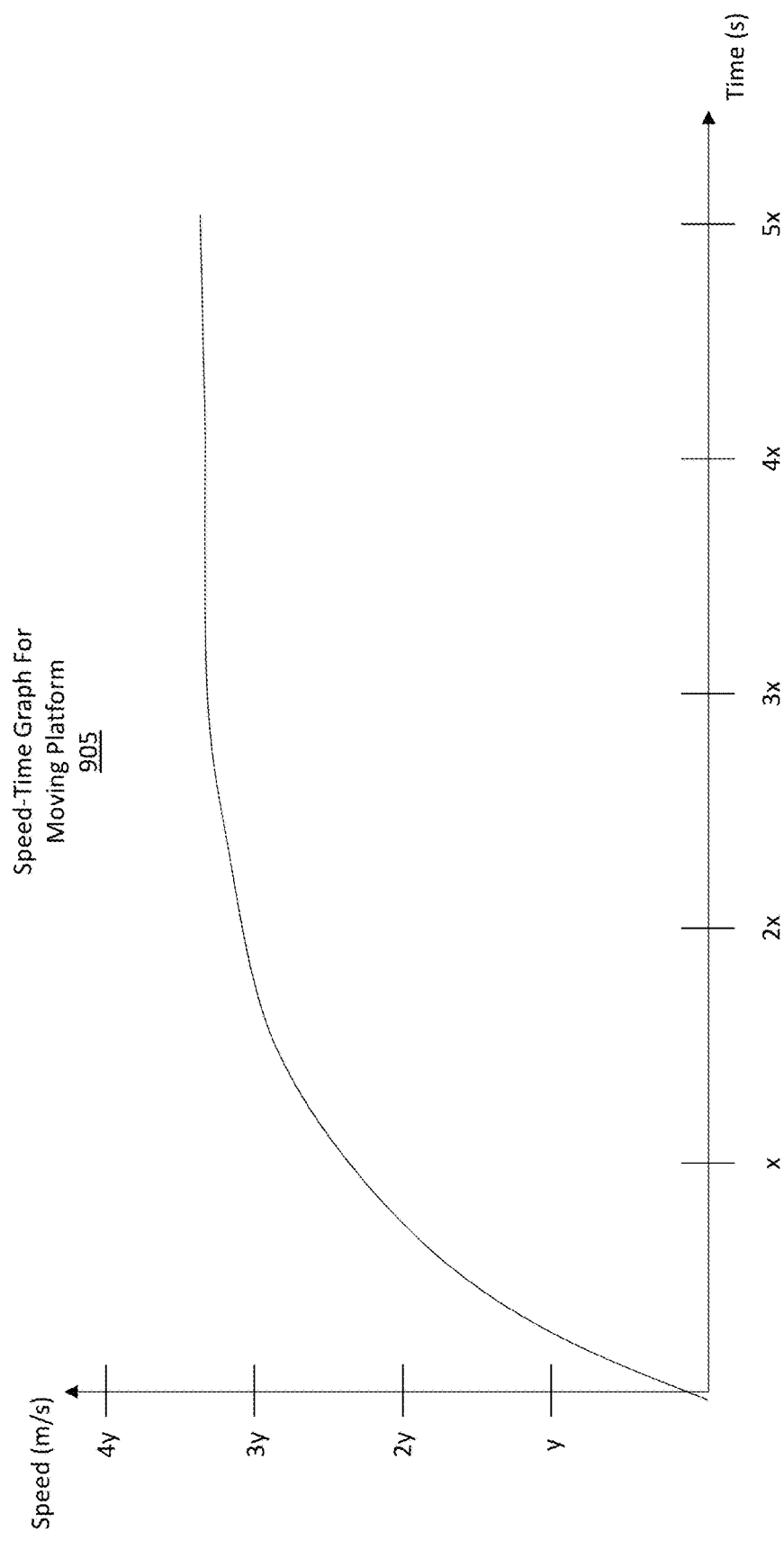
Figure 9C:
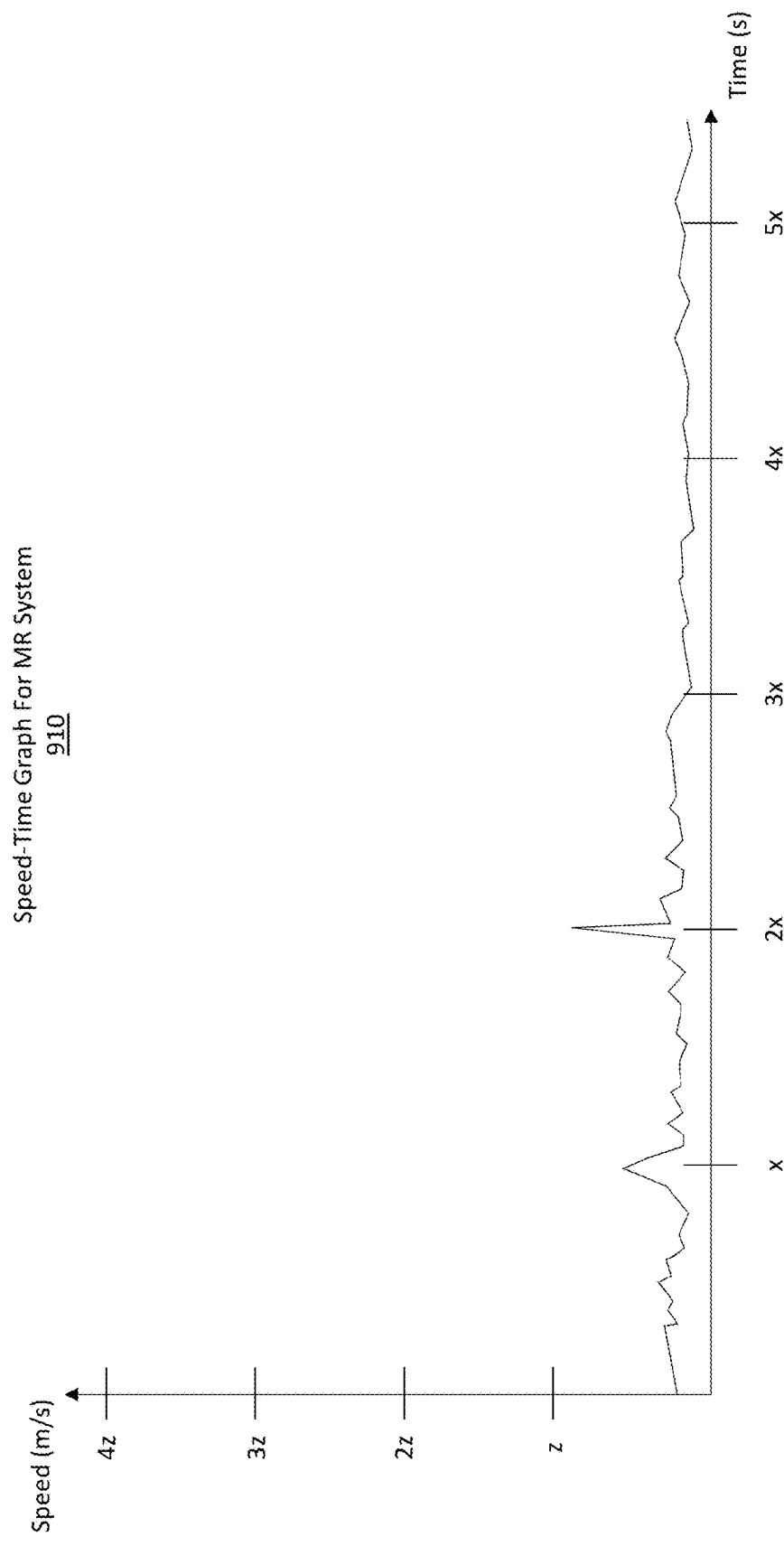

FIGS. 9A, 9B, and 9C provide some non-limiting, simplified examples of the time-limited series of convoluted motion data 810. In particular, FIG. 9A shows a time-limited series of convoluted motion data 900. Recall, this motion data is actually a convoluted combination of two different signals, namely, the motion data for the MR system and the motion data for the moving platform. FIG. 9B shows an isolated depiction of just the motion data for the moving platform, as shown by the speed-time graph for moving platform 905. FIG. 9C shows an isolated depiction of just the motion data for the MR system, as shown by the speed-time graph for MR system 910. The time-limited series of convoluted motion data 900 in FIG. 9A is thus a convolution of the signals from FIGS. 9B and 9C. From this figure, one can observe how the higher frequency motion of the HMD "rides" on the motion of the platform.

The ML algorithm is able to operate using the time-limited series of convoluted motion data. Further, it is able to operate directly on that data without having to decompose that signal into its two constituent parts (i.e. the signals shown in FIGS. 9B and 9C). To be clear, one objective of the disclosed embodiments is to use motion data to determine a category for a platform that is moving. That is, the motion is used to identify the platform. The embodiments are able to perform this identification process even though the data the embodiments operate on include multiple different signal components.

In some cases, the IMU continuously or perhaps periodically collects motion data. The embodiments are able to monitor the characteristics of that motion data. When the characteristics of the motion data change, such as in the case where the platform begins to move (resulting in the generation of convoluted motion data), then the embodiments can trigger the various operations disclosed herein. In this manner, the embodiments are able to collect the time-limited series of convoluted motion data 810.

The convoluted motion data 810 is referred to as "time-limited" because the duration of the most relevant data (in terms of being able to perform the classification or categorization) in the convoluted data is often quite short. For instance, consider the elevator scenario. It is desirable to be able to detect that the platform (i.e. the elevator) is moving and then immediately modify or adjust the motion model to account for that movement. Thus, the motion data that is collected within the first few milliseconds or perhaps seconds of the movement of the platform are considered the most critical data points. It is those data points that can be used to determine what type of movement is occurring, what type of platform exists, and how the motion model is to be updated. Subsequent data is less important when considering how to update the motion model.

In this regard, the embodiments are configured to monitor collected motion data. When the characteristics of the motion data change, such as when the platform begins to move, the embodiments are triggered to collect a limited duration of the convoluted motion data. This limited data is referred to as the time-limited series of convoluted motion data 810, as illustrated in FIG. 8. That time-limited series of convoluted motion data 810 is then fed as input to the service 805, and particularly to the ML algorithm 805A.

The ML algorithm 805A is a type of trained predictive ML algorithm. The ML algorithm 805A is trained to categorize moving platforms using convoluted motion data. Notably, the ML algorithm 805A was trained to perform its categorization without having to decompose the convoluted motion data into its constituent motion data components (e.g., the motion data reflective of the MR system's motion and the motion data reflective of the platform's movements).

During the training phase, the ML algorithm 805A can be trained using supervised training techniques. Any amount of convoluted motion data can be provided to the ML algorithm 805A.

Recall, the convoluted motion data includes motion data for the MR system's movement and motion data for the platform's movement. There are many different types of platforms that exist on which an MR system can operate. For instance, the platforms can include, but certainly are not limited to, any type of plane, train, automobile, sea vessel, elevator, or any other moveable enclosure. Furthermore, when the MR system is implemented as a wearable device, that wearable device can be subjected to numerous different types of movement. Despite the wide variety of possible movements that can occur, the ML algorithm 805A is trained to recognize a type of platform on which the MR system is operating based only on the received convoluted motion data 810.

In some cases, additional or supplemental information can also be provided as input to the service 805. For instance, the MR system is able to use its cameras (e.g., perhaps the HT cameras mentioned previously) to generate images 835. The embodiments are able to analyze these images to generate a camera-based isolated movement 840 of the HMD. That is, this movement reflects the movement of the HMD/MR system itself and is based on the detection of feature points in the images and how the locations of those feature points change based on the movement of the MR system. The embodiments can then generate motion data 845 from the camera-based isolated movement 840, where this motion data 845 reflects the motion of only the MR system, not of the platform. The motion data 845 can then optionally be provided as input to the service 805 to assist the service 805 is categorizing the type of platform on which the MR system is operating. For instance, the ML algorithm 805A can optionally use the motion data 845 to filter out the motion of the HMD in the time-limited series of convoluted motion data 810, now leaving only the motion of the moving platform.

In various embodiments, the service 805, and particularly the ML algorithm 805A, is structured to generate or assign a category 850 to the moving platform based on an analysis of the time-limited series of convoluted motion data 810. As examples only, the category can be selected from any one of a plane-like category, a rail-like category, an automobile-like category, a sea vessel-like category, an elevator-like category, and so on without limit. The category is supposed to generally reflect the "type" of the platform. Of course, other categories can also be used. For instance, the category can be selected from one of a slow and smooth category, a fast and abrupt category, or a moderate category.

Optionally, the service 805 can also generate a probability 855 that indicates the accuracy of its identified category. Various thresholds can be established as well. For instance, if the probability 855 falls under an established threshold, then the service 805 might select a default/fallback category instead and/or additionally some other operation, such as the collection of additional convoluted motion data in an attempt to improve its categorization determination in the future.

By categorizing the platform, the embodiments can then select proper parameters 865 for the motion model 860 so that the motion model 860 can accurately reflect the motion of the platform. That is, customized parameters can be established for the various different categories. After the platform is properly categorized, the embodiments can then select the corresponding set of parameters and update the motion model. The embodiments can then use that updated motion model to display the hologram.

In some embodiments, the service 805 can also preemptively generate a prediction 870 regarding the category for the platform. For instance, the service 805 can optionally receive the images 835 and perform image analysis on those image 835. The service 805 can then use the image data to identify the type or category for the platform. The service 805 can then preemptively select parameters for the motion model even before the platform is detected as moving. The collected convoluted motion data can then be analyzed and used to confirm the prediction 870 and the selected category. Further details on this aspect will be provided later.

Figure 10:
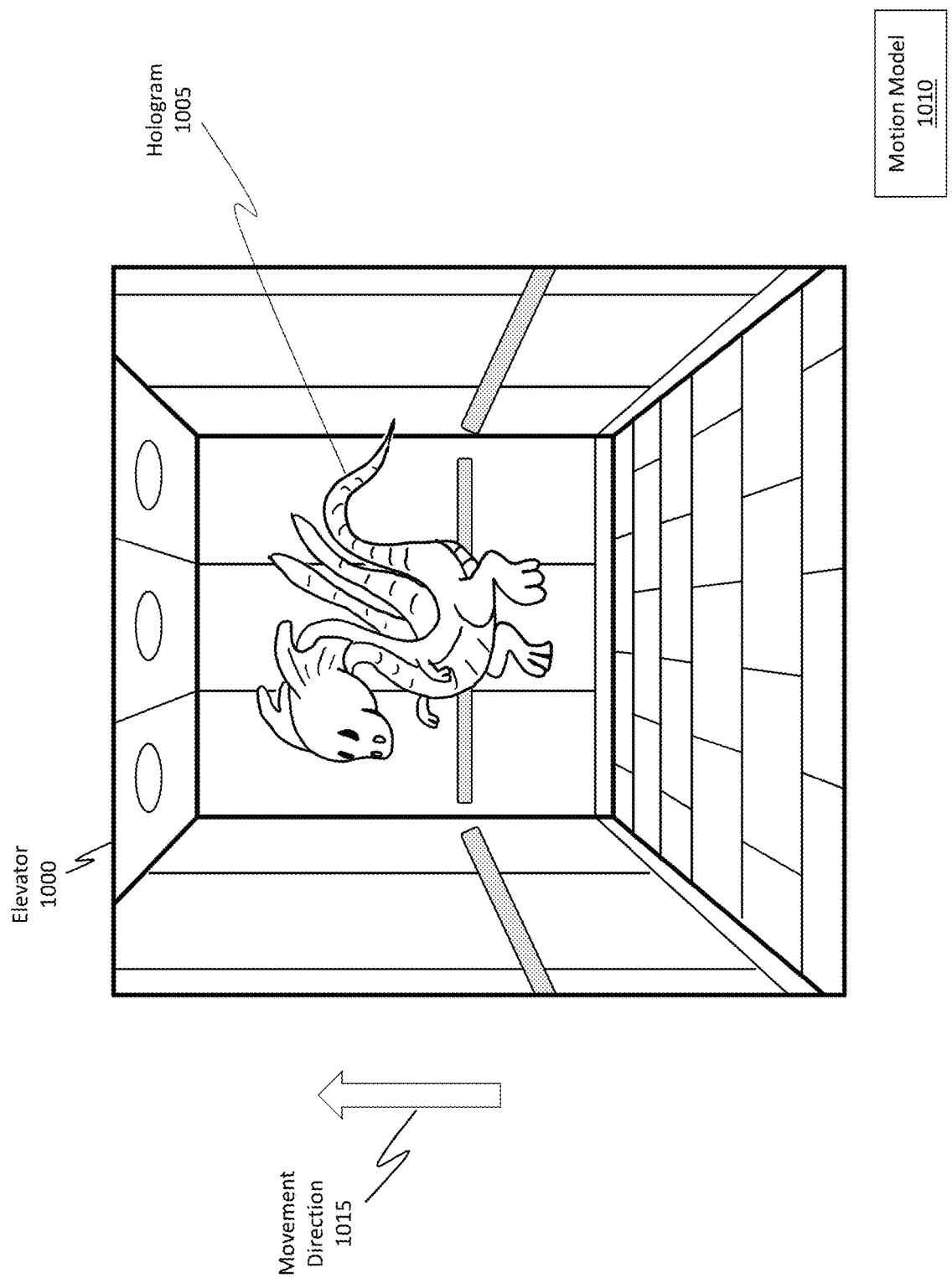
FIG. 10 illustrates the use of an updated motion model to display holograms.

FIG. 10 shows an example scenario involving a moving elevator 1000. Here, a hologram 1005 is displayed. The motion model 1010 has been updated based on the determined category for the elevator 1000 (e.g., an elevator-like category). Despite the elevator 1000 moving, as shown by movement direction 1015, the hologram 1005 can be displayed in the correct, fixed position because the motion model 1010 is adequately compensating for the movement of the elevator 1000. Thus, the embodiments improve the display of content and significantly improve the user's experience.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
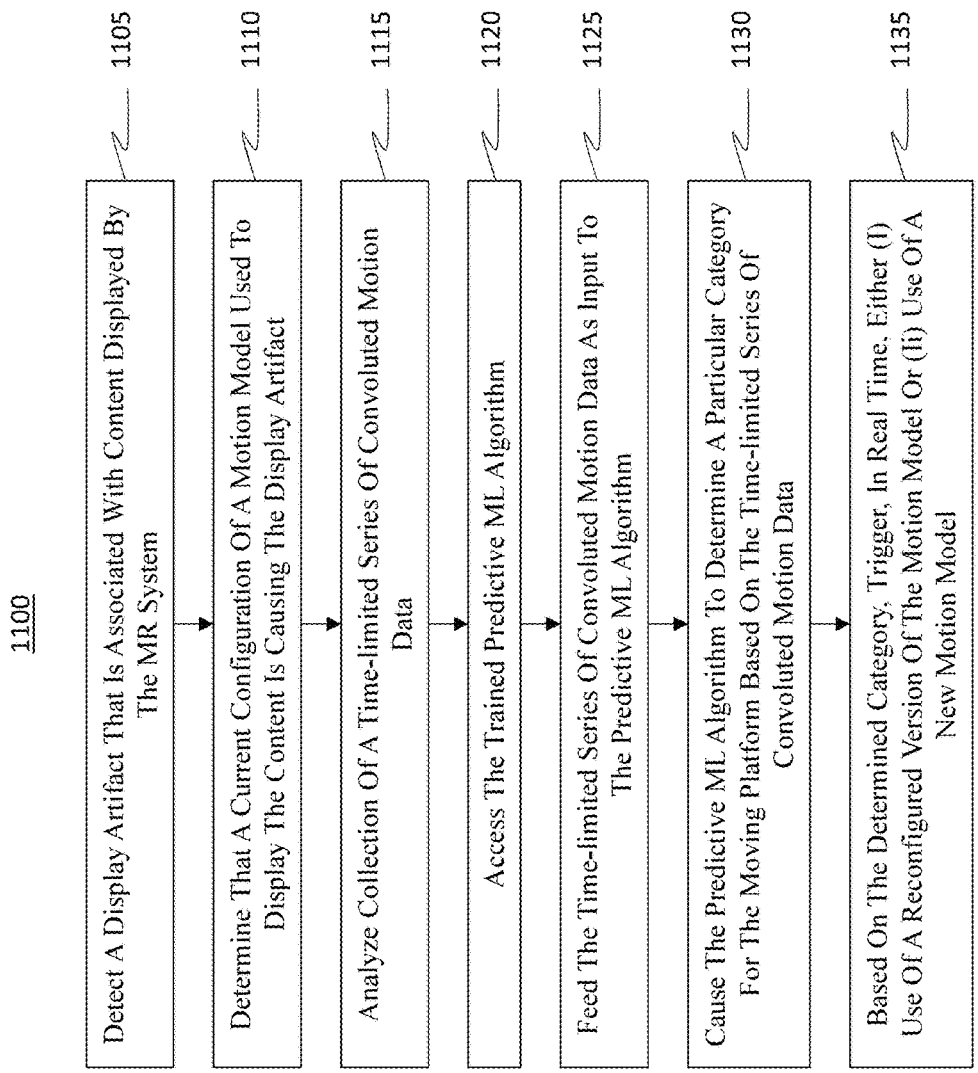
FIG. 11 illustrates a flowchart of an example method for determining a category for a moving platform.

Attention will now be directed to FIG. 11, which illustrates a flowchart of an example method 1100 for using a trained predictive machine learning (ML) algorithm to use convoluted motion data to inferentially determine a category for a moving platform on which a mixed-reality (MR) system is operating. The convoluted motion data comprises at least a first signal and a second signal, and the trained predictive ML algorithm determines the category without decomposing the convoluted signal. Method 1100 can be implemented within the architecture 800 of FIG. 8. Method 1100 can also be implemented by the service 805, which can optionally be a cloud service.

Method 1100 includes an act (act 1105) of detecting a display artifact that is associated with content displayed by the MR system. It should be noted that the disclosed embodiments are often reactive in their configuration. That is, the embodiments detect a display artifact or detect a change in characteristics for motion data. After this detection, the embodiments then perform various reactive operations in an attempt to rectify the display artifact.

As mentioned previously, however, some embodiments operate in a preemptive manner, such as by predicting the category for the platform based on the image data. For instance, suppose the images show how the user or HMD is approaching a car. Some embodiments will identify the car and then predict the user or HMD is about to enter the car. The embodiments may then select a set of motion model parameters that can be used to compensate for the motion of a car. The motion model can then be updated using these new parameters. Motion data can then be collected and used to verify the prediction. Thus, in this sense, these embodiments are predictive in nature and are not reactive. Method 1100 is generally focused on the reactive aspect of the embodiments.

Act 1110 of method 1100 then includes determining that a current configuration of a motion model used to display the content is causing the display artifact. For instance, the motion model may currently be configured for use with stationary platforms, not moving platforms. Thus, the framework provided by the motion model cannot adequately compensate for the movement of the platform. In one example, the motion model may be a stationary motion model configured for use with a stationary platform. The motion model can be or can include a Kalman filter. The Kalman filter can estimate the motion of the moving platform.

Act 1115 includes triggering collection or perhaps analyzing the already-collected time-limited series of convoluted motion data. The time-limited series of convoluted motion data includes first motion data representing a motion of the MR system and second motion data representing a motion of the moving platform. The first motion data is convoluted with the second motion data to form the time-limited series of convoluted motion data. The time-limited series of convoluted motion data can include angular position data, angular velocity data, and/or linear acceleration data.

The time-limited series of convoluted motion data is limited in time duration. For instance, the time duration can be set to be no more than 5 seconds, such that only 5 seconds worth of data is acquired. In some cases, the time duration is between about 0.5 seconds and about 5 seconds. In some cases, the time duration is about 0.5 seconds.

In some embodiments, the time-limited series of convoluted motion data is data obtained from an IMU that is included as a part of the MR system. Optionally, the time-limited series of convoluted motion data includes data having 6 degrees of freedom (DOF) characteristics. In some cases, the time-limited series of convoluted motion data includes data having at least 3 DOF characteristics.

Act 1120 includes accessing the trained predictive ML algorithm, which is trained to categorize moving platforms using convoluted motion data without decomposing the convoluted motion data into its constituent motion data components. For instance, the ML algorithm 805A of FIG. 8 can be accessed.

Act 1125 includes feeding the time-limited series of convoluted motion data as input to the predictive ML algorithm. For instance, FIG. 8 shows how the time-limited series of convoluted motion data 810 is being fed as input to the ML algorithm 805A.

Act 1130 includes causing the predictive ML algorithm to determine a particular category for the moving platform. This determination is based on the time-limited series of convoluted motion data. Advantageously, the category is determined in less than 0.5 seconds after the motion of the moving platform is detected. Stated differently, after the characteristics of the motion data are determined to have changed (which reflects that the platform is now moving), the embodiments operate quickly in order to categorize the platform and select updated parameters for the motion model. In some cases, the time period is slightly longer. For instance, the category may be identified within 0.5 seconds to 5 seconds after the motion of the moving platform is detected.

Optionally, the process of determining the category for the moving platform can be further based on a probability metric generated by the predictive ML algorithm. The probability metric indicates a likelihood that the moving platform actually is of the category identified by the predictive ML algorithm.

Based on the determined category, act 1135 includes triggering, in real time, either (i) use of a reconfigured version of the motion model or (ii) use of a new motion model. For instance, a new set of parameters can be selected and used with the existing motion model to reconfigure it. Alternatively, a different motion model that is already tailored to operate with the identified category can optionally be used. Regardless, either one of the reconfigured version of the motion model or the new motion model are configured for use with the moving platform.

Figure 12:
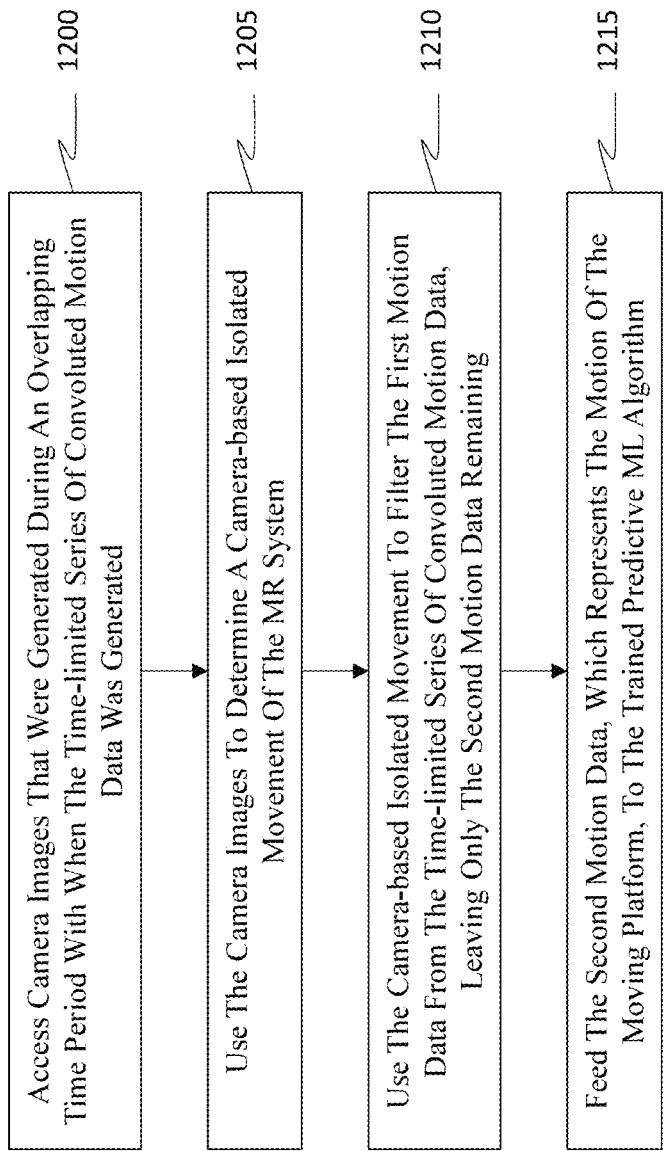
FIG. 12 illustrates a flowchart for using image data to assist in determining a platform's category.

In some implementations, additional method acts can be performed, as shown in FIG. 12. For instance, act 1200 involves accessing camera images that were generated during an overlapping time period with when the time-limited series of convoluted motion data was generated. For instance, the images 835 can be representative of these camera images.

Act 1205 includes using the camera images to determine a camera-based isolated movement of the MR system. Act 1210 includes using the camera-based isolated movement to filter the first motion data from the time-limited series of convoluted motion data, leaving only the second motion data remaining. Finally, act 1215 includes feeding the second motion data, which represents the motion of the moving platform, to the trained predictive ML algorithm. The ML algorithm can thus optionally use a combination of motion data and image data to categorize the platform.

Figure 13:
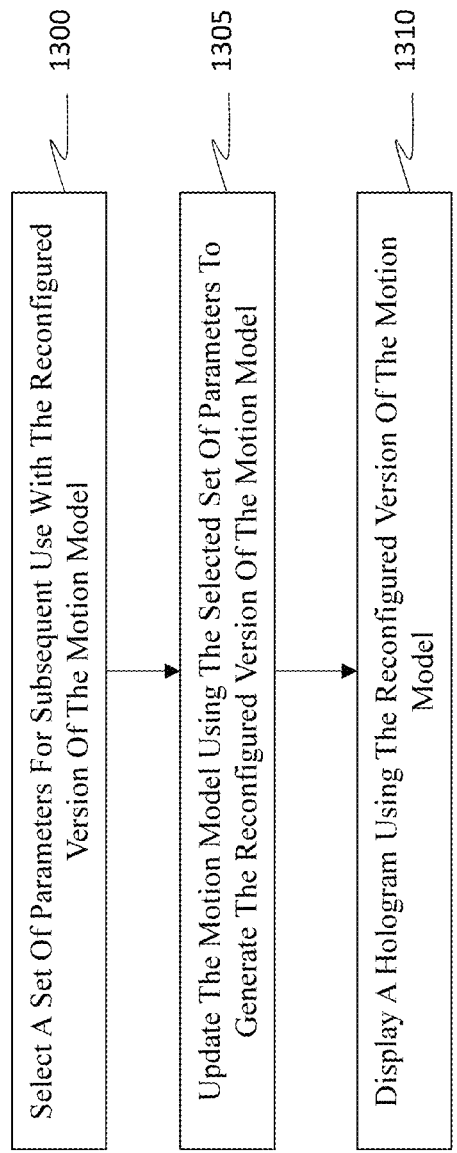
FIG. 13 illustrates a flowchart of an example process for selecting a motion model's parameters based on the category determined for a platform.

Some additional, optional acts are shown in FIG. 13. For instance, act 1300 includes selecting a set of parameters for subsequent use with the reconfigured version of the motion model. The set of parameters are selected based on the particular category. Notably, different categories are associated with different sets of parameters.

Act 1305 includes updating the motion model using the selected set of parameters to generate the reconfigured version of the motion model. Finally, act 1310 includes displaying a hologram using the reconfigured version of the motion model.

Accordingly, the disclosed embodiments are beneficially able to determine a category for a moving platform. Having identified this category, the embodiments can then facilitate the selection of parameters for a motion model so that the motion model can compensate for the motion of the platform. This compensation beneficially improves the display of holograms by the MR system.

Example Computer/Computer Systems

Figure 14:
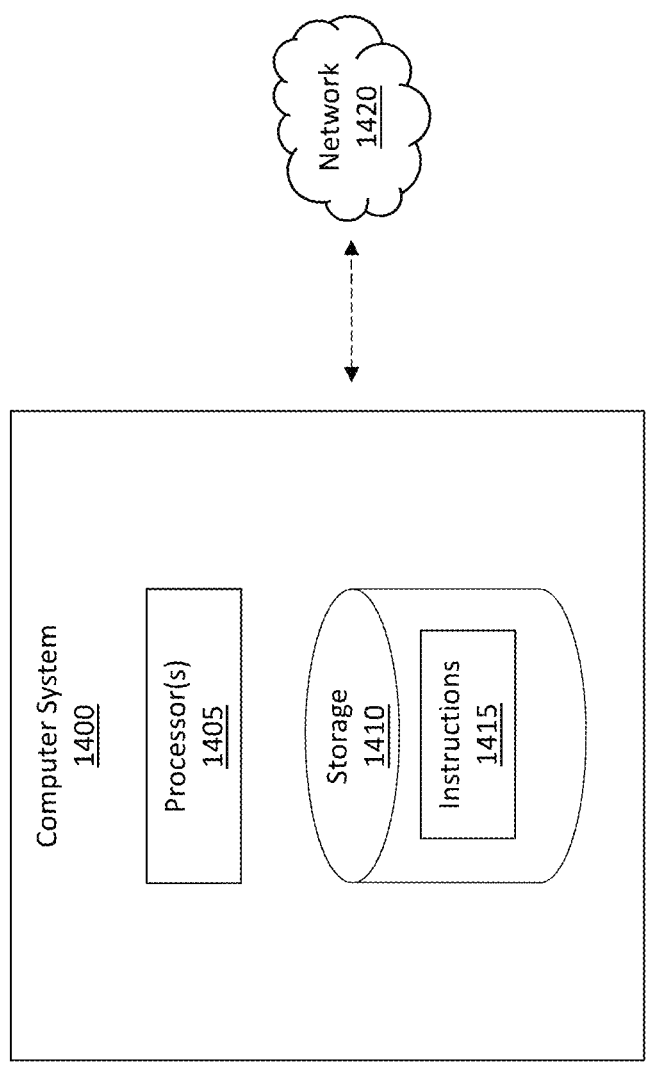
FIG. 14 illustrates an example computer system that can be configured to perform any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet, a desktop, a laptop, a mobile device, or a standalone device, such as those described throughout this disclosure. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit") and storage 1410.

Regarding the processor(s) 1405, it will be appreciated that the functionality described herein can be performed, at least in part, by one or more hardware logic components (e.g., the processor(s) 1405). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage 1410 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1410 is shown as including executable instructions 1415. The executable instructions 1415 represent instructions that are executable by the processor(s) 1405 of computer system 1400 to perform the disclosed operations, such as those described in the various methods.

The disclosed embodiments may comprise or utilize a special-purpose or general-purpose computer including computer hardware, such as, for example, one or more processors (such as processor(s) 1405) and system memory (such as storage 1410), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network. Furthermore, computer system 1400 may also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for using a trained predictive machine learning (ML) algorithm to use convoluted motion data to inferentially determine a category for a moving platform on which a mixed-reality (MR) system is operating, the convoluted motion data comprising at least a first signal and a second signal, and the trained predictive ML algorithm determines the category without decomposing the convoluted signal, said method comprising:
   detecting a display artifact that is associated with content displayed by the MR system;
   determining that a current configuration of a motion model used to display the content is causing the display artifact;
   analyzing a time-limited series of convoluted motion data, wherein the time-limited series of convoluted motion data includes first motion data representing a motion of the MR system and second motion data representing a motion of the moving platform, and wherein the first motion data is convoluted with the second motion data to form the time-limited series of convoluted motion data;
   accessing the trained predictive ML algorithm, which is trained to categorize moving platforms using convoluted motion data without decomposing the convoluted motion data into its constituent motion data components;
   feeding the time-limited series of convoluted motion data as input to the predictive ML algorithm;
   causing the predictive ML algorithm to determine a particular category for the moving platform based on the time-limited series of convoluted motion data; and
   based on the determined category, triggering, in real time, either (i) use of a reconfigured version of the motion model or (ii) use of a new motion model.

2. The method of claim 1, wherein the time-limited series of convoluted motion data is data obtained from an inertial measurement unit (IMU) that is included as a part of the MR system.

3. The method of claim 1, wherein the time-limited series of convoluted motion data includes data having 6 degrees of freedom (DOF) characteristics.

4. The method of claim 1, wherein the time-limited series of convoluted motion data includes data having at least 3 degrees of freedom (DOF) characteristics.

5. The method of claim 1, wherein the particular category is determined in less than 0.5 seconds after the motion of the moving platform is detected.

6. The method of claim 1, wherein the motion model is a stationary motion model configured for use with a stationary platform, and wherein either one of the reconfigured version of the motion model or the new motion model are configured for use with the moving platform.

7. The method of claim 1, wherein the motion model is a Kalman filter.

8. The method of claim 1, wherein the method further includes:
   accessing camera images that were generated during an overlapping time period with when the time-limited series of convoluted motion data was generated;
   using the camera images to determine a camera-based isolated movement of the MR system;

using the camera-based isolated movement to filter the first motion data from the time-limited series of convoluted motion data, leaving only the second motion data remaining; and feeding the second motion data, which represents the motion of the moving platform, to the trained predictive ML algorithm.

9. The method of claim 1, wherein the time-limited series of convoluted motion data is limited in time duration, and wherein the time duration is no more than 5 seconds.

10. The method of claim 9, wherein the time duration is between 0.5 seconds and 5 seconds.

11. The method of claim 10, wherein the time duration is about 0.5 seconds.

12. The method of claim 1, wherein determining the particular category for the moving platform is further based on a probability metric generated by the predictive ML algorithm, where the probability metric indicates a likelihood that the moving platform actually is of the particular category identified by the predictive ML algorithm.

13. The method of claim 1, wherein the particular category is selected from one of a plane-like category, a rail-like category, an automobile-like category, a sea vessel-like category, or an elevator-like category.

14. The method of claim 1, wherein the particular category is selected from one of a (i) slow and smooth category, (ii) a fast and abrupt category, or (iii) a moderate category.

15. The method of claim 1, wherein the method further includes:
  selecting a set of parameters for subsequent use with the reconfigured version of the motion model, wherein the set of parameters are selected based on the particular category, and wherein different categories are associated with different sets of parameters;
  updating the motion model using the selected set of parameters to generate the reconfigured version of the motion model; and
  displaying a hologram using the reconfigured version of the motion model.

16. A mixed-reality (MR) system that uses a trained predictive machine learning (ML) algorithm to use convoluted motion data to inferentially determine a category for a moving platform on which the MR system is operating, the convoluted motion data comprising at least a first signal and a second signal, and the trained predictive ML algorithm determines the category without decomposing the convoluted signal, said MR system comprising:
  at least one processor; and
  at least one hardware storage device that stores instructions that are executable by the at least one processor to cause the MR system to:
    detect a display artifact that is associated with content displayed by the MR system;
    determine that a current configuration of a motion model used to display the content is causing the display artifact;
    analyze a time-limited series of convoluted motion data, wherein the time-limited series of convoluted motion data includes first motion data representing a motion of the MR system and second motion data representing a motion of the moving platform, and wherein the first motion data is convoluted with the second motion data to form the time-limited series of convoluted motion data;
    access the trained predictive ML algorithm, which is trained to categorize moving platforms using convoluted motion data without decomposing the convoluted motion data into its constituent motion data components;
    feed the time-limited series of convoluted motion data as input to the predictive ML algorithm;
    cause the predictive ML algorithm to determine a particular category for the moving platform based on the time-limited series of convoluted motion data; and
    based on the determined category, trigger, in real time, either (i) use of a reconfigured version of the motion model or (ii) use of a new motion model.

17. The MR system of claim 16, wherein the motion model is a Kalman filter.

18. The MR system of claim 17, wherein the Kalman filter estimates the motion of the moving platform.

19. The MR system of claim 16, wherein the time-limited series of convoluted motion data includes angular position data, angular velocity data, and linear acceleration data.

20. A mixed-reality (MR) system that uses a trained predictive machine learning (ML) algorithm to use convoluted motion data to inferentially determine a category for a moving platform on which the MR system is operating, the convoluted motion data comprising at least a first signal and a second signal, and the trained predictive ML algorithm determines the category without decomposing the convoluted signal, said MR system comprising:
  at least one processor; and
  at least one hardware storage device that stores instructions that are executable by the at least one processor to cause the MR system to:
    detect a display artifact that is associated with content displayed by the MR system;
    determine that a current configuration of a motion model used to display the content is causing the display artifact;
    analyze a time-limited series of convoluted motion data, wherein the time-limited series of convoluted motion data includes first motion data representing a motion of the MR system and second motion data representing a motion of the moving platform, and wherein the first motion data is convoluted with the second motion data to form the time-limited series of convoluted motion data;
    access the trained predictive ML algorithm, which is trained to categorize moving platforms using convoluted motion data without decomposing the convoluted motion data into its constituent motion data components;
    feed the time-limited series of convoluted motion data as input to the predictive ML algorithm;
    cause the predictive ML algorithm to determine a particular category for the moving platform based on the time-limited series of convoluted motion data; and
    based on the determined category, select a new set of parameters for the motion model.

* * * * *